United States Patent [19]

Grassl et al.

[11] Patent Number: 4,461,444
[45] Date of Patent: Jul. 24, 1984

[54] SPRUNG VEHICLE SEAT

[75] Inventors: Karl J. Grassl, Schwandorf; Hermann Meiller, Amberg, both of Fed. Rep. of Germany

[73] Assignee: Willibald Grammer, Amberg, Fed. Rep. of Germany

[21] Appl. No.: 320,612

[22] Filed: Nov. 12, 1981

[30] Foreign Application Priority Data

Nov. 15, 1980 [DE] Fed. Rep. of Germany ....... 3043177

[51] Int. Cl.³ .............................................. A47C 3/30
[52] U.S. Cl. .................................. 248/550; 248/430; 248/631; 297/347; 297/339
[58] Field of Search ............... 248/550, 424, 429, 430, 248/631; 297/347, 339

[56] References Cited

U.S. PATENT DOCUMENTS

| 3,150,855 | 9/1964 | Carter | 248/550 |
|---|---|---|---|
| 3,325,136 | 6/1967 | Rodke et al. | 248/631 |
| 3,638,897 | 2/1972 | Harder, Jr. et al. | 248/550 |
| 3,951,373 | 4/1976 | Swenson et al. | 248/550 |
| 3,954,245 | 5/1976 | Costin | 248/631 |
| 3,999,800 | 12/1976 | Penzotti | 248/550 |
| 4,148,518 | 4/1979 | Wilbeuf | 248/631 |
| 4,213,594 | 7/1980 | Pietsch et al. | 248/550 |
| 4,264,050 | 4/1981 | Wahls | 248/550 |

Primary Examiner—Reinaldo P. Machado
Assistant Examiner—Alvin Chin-Shue
Attorney, Agent, or Firm—Staas & Halsey

[57] ABSTRACT

A sprung vehicle seat which adjusts to a preset height, even when accommodating people of different weights, and which also permits adjustment of the preset height, is supported by a gas spring. An actuator which is linearly movable when there is a change in the seat height can cooperate with a switching mechanism, which includes a valve spaced apart from a switch, to control the volume of air in the gas spring. A holder carrying either the switching mechanism or the actuator is pivotably mounted on a slider which is linearly movable unless it is locked into place. When the holder is in a first angular position, the actuator and the switching mechanism are separated to avoid unnecessary actuation of the gas spring during bouncing movements, and when it is in a second angular position the actuator and the switching mechanism are moved toward each other so that they can cooperate to adjust the seat to the preset height. A manually operable three-stage actuating mechanism is operative during a first actuating stage to pivot the holder into its second position, during a second stage to unlock the slider, and during a third stage to shift the slider from one position to another so as to change the preset height. The actuating mechanism has only a single lever, which is movable in two different modes (such as rotation about its axis and rotation about a line perpendicular to the axis) to accomplish the three actuating stages.

20 Claims, 8 Drawing Figures

SPRUNG VEHICLE SEAT

BACKGROUND OF THE INVENTION

The invention is concerned with a sprung vehicle seat which is adjustable for weight, so that the vehicle seat is always at the same preset height even when the occupants of the seat are of different weights, and which also permits the preset height to be adjusted.

Such a seat may comprise a gas spring which is disposed between a seat support frame carrying the upholstery or cushion or the like and a main or base frame, a switching means for controlling the gas spring and an actuator member which is displaced relative to the switching means when there is a change in the height of the seat support frame above the main frame. The seat may further comprise a slide member which can be fixed to one of the seat support and main frames, for the purposes of height adjustment, selectively in a plurality of positions on a line of displacement which is parallel to the relative displacement between the switching means and the actuator member, and a holder which is movable on the slide member transversely with respect to the line of displacemnt thereof between a first and a second position and which carries either the switching means or the actuator member. In the first position of the holder, into which it is spring-biassed, the actuator member and the switching means are spaced from each other in a direction transverse with respect to their relative movement by a spacing such that the actuator member and the switching means do not come into co-operation with each other in the event of normal spring movements of the seat, in order to avoid unnecessary actuation of the gas spring, while in the second position of the holder, the actuator member and the switching means are sufficiently close together in a direction transverse to their relative movement that they co-operate for the purposes of adjustment for weight. The seat further comprises a three-stage or three-phase actuating means which includes at least one pivotal actuating lever and which, in the first actuating phase or stage, pivots the holder into its second position, in the subsequent second actuating stage it releases the locking on the slide member, and in a third actuating stage, it shifts the slider from one position into another.

A vehicle seat of the above-indicated general kind can be used in particular on tractors, but it can also be employed for other vehicles.

DAS (German published application) No. 15 05 507 describes a vehicle seat of the above-indicated general kind, in which the lower end of the slide member is guided vertically on the main frame and the upper end of the slide member can be engaged with a row of detent positions on the seat support frame. The actuator member is provided on the holder, and the switching means for controlling the gas spring is stationarily secured to the main frame.

For the purposes of engaging the slide member with the substantially vertical row of detent positions on the seat support frame, the arrangement has a transverse pin member which is fixed to the upper end of the slide member and which can be brought into engagement with the detent assembly. The slide member is pivotal at its lower, vertically guided end, about an axis which is parallel to the above-mentioned upper transverse pin member. A rod which is pivotally connected to the pin member and which extends normal thereto engages into a tube member which is rotatable transversely to the longitudinal direction of the rod, and is biassed towards the detent arrangement by a spring disposed in the tube member, so that the transverse pin member is urged into detent engagement. A crank which is pivotal separately about the axis of rotation of the tube member is connected to the transverse pin member by way of a connecting rod. The arrangement has a pivotal actuating lever for pivoting the tube member, and a pivotal actuating lever for rotating the crank, while the actuating lever for the crank engages upon pivotal movement into a recess in the actuating lever to produce pivotal movement of the tube member.

The mode of operation in regard to actuation of the above-discussed vehicle seat is as follows:

In a first actuating phase, the actuating lever, which is rigidly connected to the crank, is pivoted so that the transverse pin member of the slide member is displaced outwardly, but without leaving the detent means. Due to the slight pivotal movement of the slide member which occurs as a result, the holder, which is in the form of a double-armed lever and which bears with one end against the tube member acting as an abutment, is pivoted in such a way that the actuator member co-operates with the switching means. Adjustment for weight is then effected.

In the second phase of actuation, the actuating lever, which is rigidly connected to the crank, must be pivoted even further until it reaches the recess in the actuating lever which is associated with the tube member. When this occurs, the transverse pin member of the slide member is taken completely out of the detent positions so that the lock between the slide member and the frame is now released.

In the third phase of actuation, both actuating levers are jointly pivoted in one direction or the other so that the transverse pin member moves along a short circular path, beyond the row of detent positions. However, the path of movement can be considered as being substantially straight. Upon release of the actuating lever, which is connected to the crank and which is disposed in the recess of the lever connected to the tube member, the slide member together with the transverse pin member is pivoted towards the row of detent positions by virtue of the force of the spring in the tube member, and the slide member comes into detent engagement with the detent arrangement, at a fresh position.

It has been found that the above-discussed arrangement suffers from the disadvantage that it has two actuating levers which confuse the user of a seat who has not previously had the mode of operation of the two levers explained to him, so that the user of the seat cannot properly operate the seat straightaway. In addition, actuating two levers in a given sequence is a complicated operation.

It has also been found that the above-discussed arrangement suffers from the disadvantage that the transition from the first phase of actuation, in which adjustment for weight is effected and the transverse pin member of the slide member is still engaged with the detent arrangement, to the second actuating phase, in which the interlock between the slide member and the detent arrangement is to be released, is a fluid situation. In many cases, an unskilled occupant of the seat will pivot the lever connected to the crank to an excessive degree so that the transverse pin member of the slide member comes out of engagement with the detent arrangement and it is not possible to make an adjustment for weight, with a fixed height of seat. The fluid transition between the first phase of actuation and the second phase of actuation at least increases the difficulty involved in operating the seat.

SUMMARY OF THE INVENTION

An object of the present invention is to design a vehicle seat which is easier and more reliable to operate.

In accordance with the invention, this and other objects are achieved by the actuating means having only a single actuating lever which is actuable in two different directions or modes and first and second entrainment members, wherein, upon actuation of the actuating lever in one of the above-mentioned directions of actuation, the first entrainment member urges the holder into the second position, and the second entrainment member, in the second actuating phase, releases the locking action on the slide member. In addition, the arrangement has a third entrainment member which is responsive or operative when the actuating lever is actuated in the other direction or mode of actuation thereof, in the third actuating phase, which third entrainment member entrains the slide member for moving it from one position into the other.

In accordance with the invention therefore, there is only a single actuating lever which is, for example, pivotal in a vertical direction and in a horizontal direction. The first and the second actuating phases, which are performed by actuation in a single direction of actuation of the lever, are separated from each other, by virtue of using two different entrainment members, so as to constitute a clearly defined limit or boundary between the two actuating phases. For the purposes of height adjustment, the seat has a third entrainment member which is responsive in a direction of actuation which is different from the direction of actuation associated with the first and the second actuating phases, so that the third phase of actuation of the seat is also clearly separated from the first two phases of actuation, and cannot be selected by mistake, because the directions of actuation are different. Therefore, it is not difficult for the occupant of the seat, even when unskilled in using it, to reliably operate the vehicle seat according to the invention.

Advantageously, in an arrangement in which the holder is mounted pivotally on the slide member, the first entrainment member, in the first stage of actuation of the actuating lever, bears against a step portion of the holder, for pivoting the holder into its second position in such a way that, in the second phase of actuation, it slides down against a side surface of the step portion, without producing further pivotal movement of the holder. As an alternative to this, it would be possible for example for an arm of the holder, which is engaged by the entrainment member, to be of a resilient or sprung nature so that the holder remains stationary in the second phase of actuation, in spite of further movement of the entrainment member, against the spring force of the arm.

The two entrainment members could be provided, for example, on a plate or disc member which is rotatable by the actuating lever so that the first entrainment member comes into engagement with the holder and the second entrainment member subsequently comes into engagement with the slide member, for releasing the locking action on the slide member. In a preferred aspect of the invention, wherein the slide member can be locked to a row of detent means provided on the frame and extending parallel to the line of movement of the slide member however, the slide member is guided linearly along the line of movement thereof, and the arrangement has a shaft which extends parallel to the line of movement of the slide member and which carries the first and the second entrainment members. The first and the second entrainment members are displaceable in the longitudinal direction of the shaft and are rotatable about the axial direction thereof, and the second entrainment member can be brought into and out of engagement with the row of detent positions, being locked to the slide member, transversely with respect to the line of movement of the slide member. In order to guarantee the succession of movements of the first and second entrainment members, a further embodiment of the invention provides that the first entrainment member is non-rotatably connected to the shaft while the second entrainment member is mounted freely rotatably on the shaft and is entrained by the first entrainment member after the first phase of actuation.

The actuating lever advantageously extends normal to the shaft, and is arranged to be pivotal about the axis of the shaft.

In this connection, it is desirable for the first and the second entrainment members to be axially fixed on the shaft and for the shaft to pass axially movably through a lug or projection of the actuating lever, being non-rotatably connected to the lug or projection. The lug or projection may be mounted on a support or bracing member secured to the frame, so as to be rotatable about the axis of the shaft. If, therefore, after being unlocked in the second phase of actuation, the slide member is moved in the third phase, then the second entrainment member is entrained and, by way of the shaft, also entrains the first entrainment member which is engaged with the holder. When that happens, however, the actuating lever remains stationary as the shaft is axially movably mounted on the lug or projection.

As already referred to hereinbefore, the actuating lever could be arranged to pivot in two mutually perpendicular directions. In that case, the lever actuates the first and second entrainment means in one direction, while in the other direction, being engaged with the slide member, it displaces the slide member along the line of movement thereof if the slide member is not locked. In that case the third entrainment member would be, for example, a rectilinear extension of the actuating lever. However, from the point of view of operating the vehicle seat, it has been found that it is more advantageous for the third entrainment member to be in the form of a crank at the end of the actuating lever, with the actuating lever rotatable about its longitudinal axis, and for the end of the crank to engage in a slot which extends transversely with respect to the line of movement of the slide member. With this arrangement therefore, in the third actuating phase, the actuating lever must be turned for example by means of a turn button or rotary knob, in order to provide for the height adjustment. Therefore, it is not possible for the height of the seat to be adjusted unintentionally, as the rotary operation is basically different from the pivoting operation.

The degree of operating comfort and convenience is further enhanced if the holder, which is spring-biassed into the first position, is engaged with the slide member in its second position, and a release or enabling element which is displaced relative to the holder when there is a change in height of the seat support frame above the main or base frame releases the locking between the holder and the slide member, in that relative position as bettween the actuator member and the switching means, in which the switching means is not actuated by the actuator member, in the second position of the holder, by virtue of the adjustment for weight having been made. In this embodiment which, in principle, can also be embodied in actuating arrangements having more than just one actuating lever, the interlock between the holder and the slide member is automatically released once an adjustment for weight has been effected. In other words, a new occupant of the seat, to whom the vehicle seat is to be adjusted in order to be set at the previous seat height, only has to briefly tap the actuating lever after he has sat down on the seat, whereupon the switching means and the actuating member co-operate and the gas spring is controlled in such a way as to set the seat to the previous height. After the vehicle seat has been set to the new weight, the actuator member and the switching means are automatically separated so that, in the event of spring flexing movement of the seat, the gas spring will not be unnecessarily actuated.

Preferably, in this connection, a double-armed detent lever is mounted pivotally on the holder. One end of the lever, which is formed as a pawl means, is biassed by a spring against a detent projection or lug on the slide member and is locked thereto in the second position of the holder, while the other end of the lever co-operates with the release element for pivoting the detent lever out of the position of engagement with the detent projection on the slide member. When the holder is released, it automatically returns to its first position as it is in fact spring-biassed into that position.

Actuation of the arrangement is further facilitated and operation thereof is made even less liable to trouble, if the frame to which the assembly comprising the slide member and the holder is secured carries a control member which is displaceable relative to the holder when there is a change in the height of the seat support frame above the main or base frame, with the actuator member or the switching means being disposed on the control member. In this way, in both limit positions of the seat support frame and when there is a change in the weight of the occupant on the seat, the arrangement ensures that the actuating means still does not jam and can still be easily operated.

Advantageously, when the vehicle seat is of the kind having a scissors-like support assembly, the slide member and the control member are arranged horizontally displaceably on one of the seat support and main frames, and the control member is connected to the end, which is horizontally movable and which engages said frame, of the respective pivotal arm of the scissors-type support assembly. Such an arrangement has the additional advantage that it is extremely compact, more specifically not just in the direction of the width of the seat but in particular also in the direction of the height of the seat.

Further features and advantages of the invention will be found from the following description of a preferred embodiment with reference to the accompanying drawings.

BRIEF DESCRIPTION OF THE DRAWINGS

FIG. 4 shows the same mechanism with the weight adjustment cut in.

DESCRIPTION OF THE PREFERRED EMBODIMENT

Figure 1:
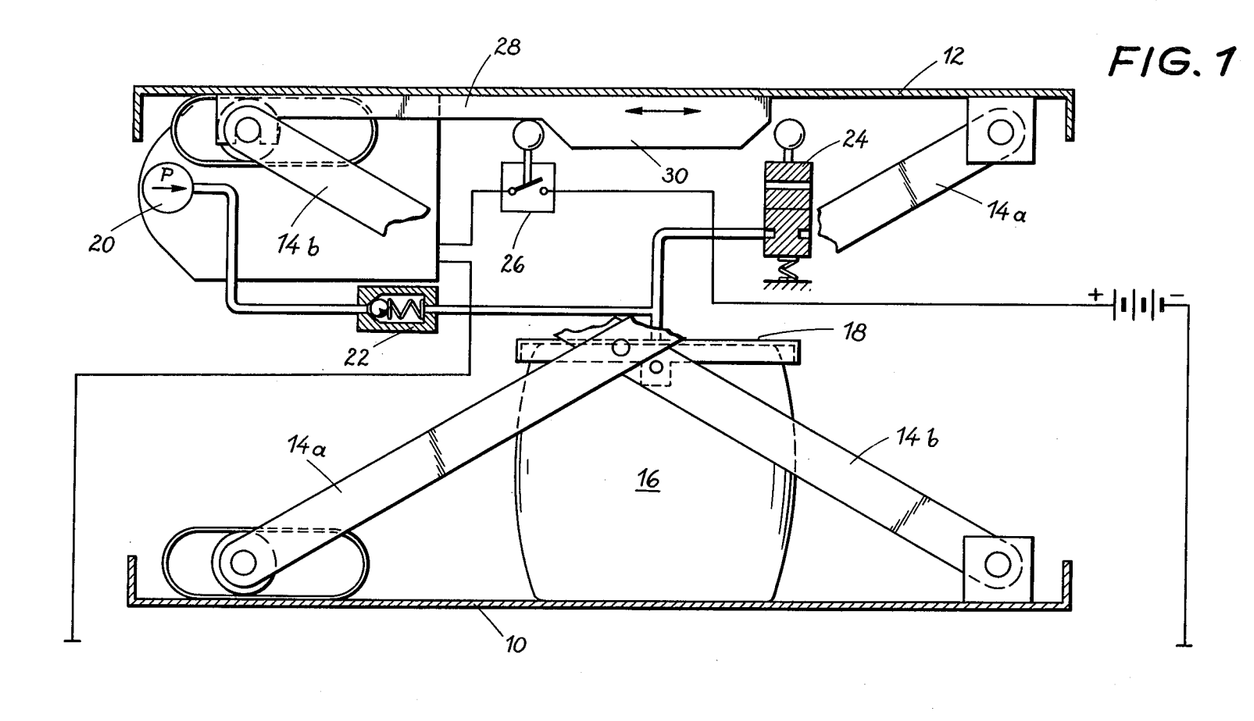
FIG. 1 is a diagrammatic view of the structure of a vehicle seat which is sprung by means of a gas spring, with height and weight adjustment.

Reference will be made first to FIG. 1. As shown therein, a main or base frame 10 is connected to a seat support frame 12 by way of a scissors-type support structure comprising pivotal arms 14a and 14b. A gas spring, for example an air bellows arrangement 16, rests on the base frame 10 and presses upwardly against a plate 18 which is fixedly connected, for example, to the pivot arm 14b. A compressor 20 is arranged below the seat support frame 12 and is connected to the air bellows arrangement 16 by way of a hose with a non-return valve 22. The bellows 16 is also connected by a further hose to an air release valve 24. A quick-action or quick-break switch is used as the control switch 26 for switching the compressor on and off. The switch 26 and the valve 24 are rigidly connected together and, in the position shown in FIG. 1, co-operate with a control member 28 which is guided for longitudinal movement in a horizontal direction on the underside of the frame 12. One end of the control member 28 is connected to the horizontally movable end of the arm 14b while the other end of the control member 28 has a control cam means and is formed as an actuator member 30 for the switch 26 and the valve 24; when the control member 28 is displaced in dependence on a change in the height of the frame 12 above the frame 10, the member 30 co-operates either with a roller for actuating the switch 26 or a roller for actuating the valve 24.

Adjustment for weight on the vehicle seat is effected with this arrangement. If for example a heavy driver sits down on the seat, the seat support frame 12 is pressed downwardly so that the control member 28 is displaced horizontally towards the left by the movable end of the arm 14b, so that the member 30 actuates the switch 26 and the compressor supplies air to the bellows arrangement 16. As the plate 18, which is acted upon by the bellows arrangement 16, is engaged to the arm 14b, the seat support frame is urged upwardly until the member 30 no longer actuates the switch 26. It has then reached its previous height.

If, conversely, a lighter driver now sits on the vehicle seat, the seat support frame 12 is lifted up by the pressure in the air bellows arrangement 16, that pressure being higher than that required by the weight of the driver, so that the member 30 now comes into operative engagement with the valve 24. Air is then released from the air bellows arrangement 16, until the seat support frame 12 has moved to its previous height, with the lighter driver thereon.

In this way, the seat support frame can be maintained at one and the same height, even when the weight of the occupants of the seat varies.

FIG. 1 does not show that the switching means for the air bellows arrangement, such switching means comprising the release valve 24 and the switch 26, is adjustable in a vertical direction between two positions, namely between the position shown in FIG. 1 in which the switching means co-operates with the member 30, and a position which is below the position shown in FIG. 1 and in which the switching means does not co-operate with the member 30, irrespective of the position in which the member 30 is disposed. Adjustment of the switching means in a vertical direction in the above-indicated manner is necessary in order to avoid unnecessary actuation of the gas spring arrangement 16, upon normal spring movements of the seat support frame.

The switching means comprising the valve 24 and the switch 26 is also displaceable in a horizontal direction and can be fixed in a plurality of positions in that direction.

The height of the seat can be adjusted in that way. More particularly, if for example the switching means comprising the valve 24 and the switch 26 is moved further towards the left in FIG. 1, with the weight of the occupant of the seat remaining unaltered, then the release valve 24 is actuated whereby the height of the seat is reduced. A converse adjustment occurs if the switching means is moved towards the right. The horizontal positioning of the switching means therefore determines the height of the seat.

It will be appreciated that, when the vehicle seat has no load thereon, the seat support frame 12 moves into its upper limit position so that it is only when the seat has a load thereon that it will adjust itself to a height which is between its lower limit position and its upper limit position. The occupant of the seat will then move the switching means, in a first actuating phase, in a vertical direction out of the inoperative position into the operative position in which it co-operates with the member 30. If the occupant of the seat is of the same weight as the previous occupant, then the seat will adjust to the previous height, without the switching means having been actuated. If the present and previous occupants are not of the same weight, then the switching means is actuated in the appropriate direction by the member 30 until the seat is set to the previously set height. If the occupant of the seat wants to alter the seat height, then he moves the switching means in a horizontal direction, while in its operative position, until the seat is at the desired height. The occupant of the seat then moves the switching means into its inoperative position by removing it from the range of action of the member 30, in a vertical direction.

Figure 2:
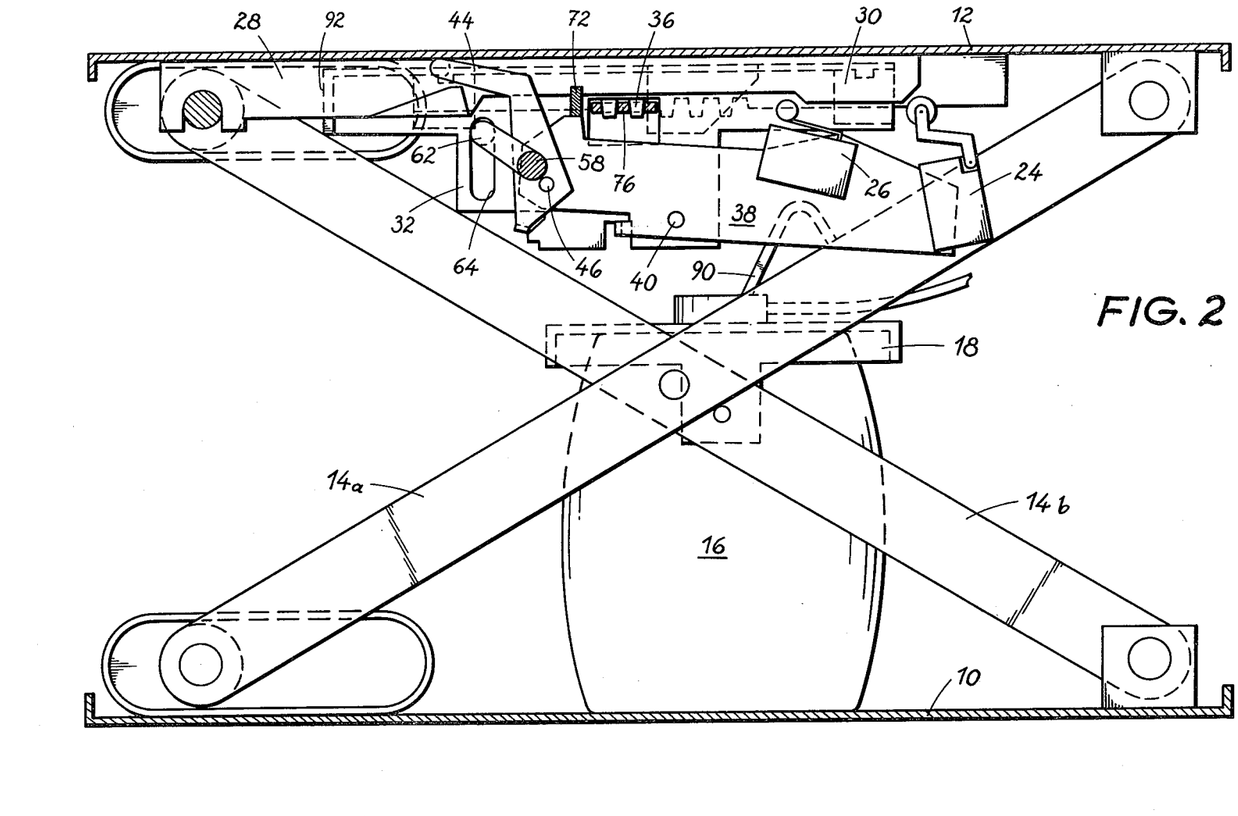
FIG. 2 shows a preferred embodiment of the mechanism for adjustment for height and weight in the seat shown in FIG. 1.
Figure 3:
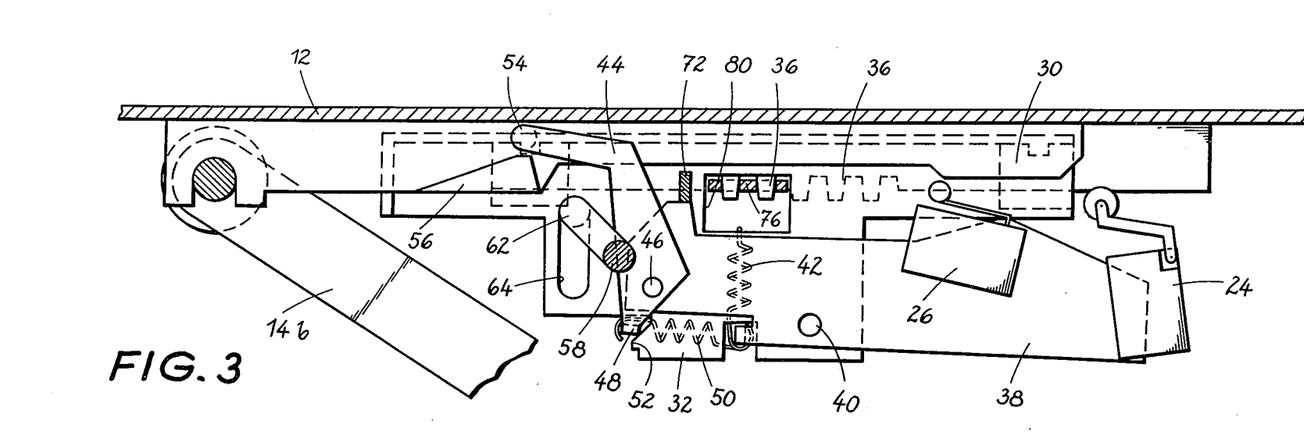
FIG. 3 shows a view on an enlarged scale of the FIG. 1 mechanism, with the weight adjustment cut out.

Reference will now be made to FIGS. 2 through 5 which show in greater detail the mechanism of vertical and horizontal adjustment of the switching means comprising the valve 24 and the switch 26. Firstly, the mechanism comprises a slide member which is guided for linear movement on the underside of the seat support frame 12 (see FIG. 5) by means of at least two pins or bolts 34 and longitudinal slots (not visible). The cross-sectional shape of the slide member 32 can be seen from FIG. 5. As will be seen from that Figure, the slide member 32 has an upwardly open U-shaped portion in which there is disposed a detent bar member 36 which is fixedly connected to the seat support frame 12 and provides a plurality of detent positions. A holder 38 of plate-like configuration is secured pivotally about a pivot point 40 to the vertically extending plate-like portion of the slide member 32. The holder 38 forms a double-armed lever, with the release valve 24 and the switch 26 being arranged on one arm of the lever, while the other arm of the lever is engaged by a spring 42 which is also secured to the slide member in order to bias the holder 38 into a first position in which the switching means comprising the valve 24 and the switch 26 is down, as shown in FIG. 3, and cannot co-operate with the member 30 on the control member 28. A double-armed detent lever 44 is arranged on the holder 38 and is pivotal about a pivot point 46. The detent lever 44 has a bent pawl end portion 48 (see FIGS. 3 and 5) which is biassed by a spring 50 bearing against the holder 38, against a detent projection 52 on the slide member 32. When the arm of the lever 38, which is remote from the switching means 24 and 26 and on which the lever 44 is also arranged, is pivoted downwardly, the pawl end portion 48 slides along the detent projection 52 until it engages under the projection 52 and secures the holder 38 in the second position in which the switching (means 24 and 26) is up and co-operates with the member 30 of the control member 28. For more particular detail of this arrangement, attention is directed to FIGS. 3 and 4.

Figure 4:
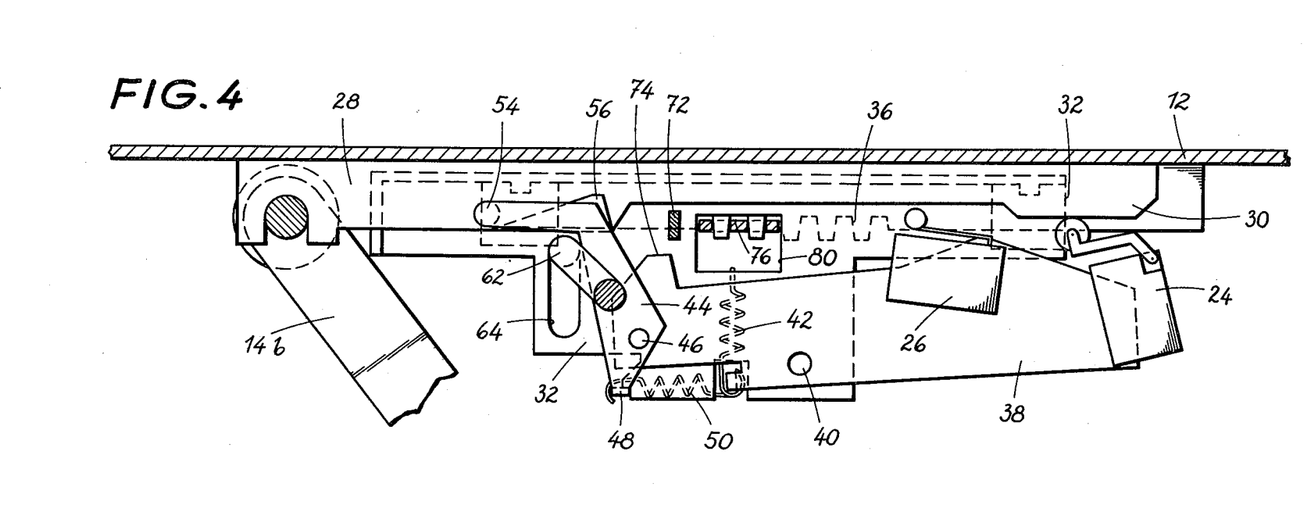

The end 54 of the lever 44, which is remote from the pawl end portion 48, co-operates with a release or enabling element 56 which is provided on the control member 28 at a suitable position and which pivots the pawl end portion 48 out of engagement with the projection 52 in the second position of the holder as shown in FIG. 4, when, after the seat has been adjusted in respect of weight, the member 30 is between the release valve 24 and the switch 26, as shown in FIG. 3. Because of the force applied by the spring 42, the holder 38 then returns to its first position in which the switching means no longer co-operates with the member 30.

The actuating arrangement will now be described in greater detail, with particular reference being made to FIG. 5. The actuating means comprises a single actuating lever 58 which is mounted rotatably about its axis in a lug or projection 60 and which extends in a horizontal direction transversely with respect to the plate-like portion of the slide member 32 and the holder 38. The end of the actuating lever which is towards the slide member 32 is formed as a crank 62 and represents a third entrainment member. The end of the crank engages into a vertical slot 64 in the slide member 32 (see FIGS. 3 and 4). When the slide member 32 is unlocked, then the slide member can be displaced along its guide means parallel to the control member 28 by rotating the actuating lever about its axis, by way of the third entrainment means which is formed by the crank 62. When this is done, however, the holder 38 and the switching means, which is secured to the holder and which comprises the valve 24 and the switch 26, is also displaced in the horizontal direction. Therefore, by rotating the actuating lever 58 about its own axis, adjustment of the height of the seat can be effected by means of the third entrainment member 62.

Figure 5:
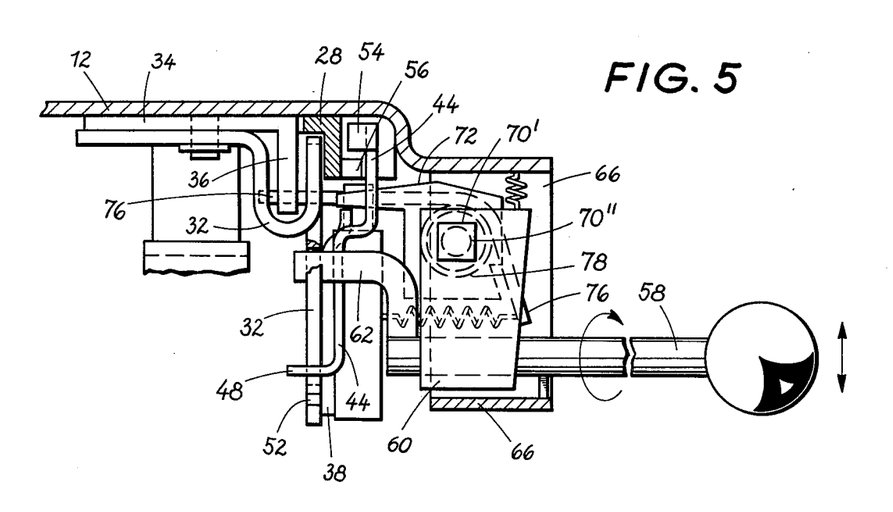
FIG. 5 shows a view in section through the mechanism in the position shown in FIG. 3.

The lug or projection 60 is also pivotal about the axis of a shaft 70, which is parallel to the line of movement of the slide member 32 and which is rotatably supported by a bracing member 66 secured to the seat support frame 12 (see FIG. 5). Shaft 70 is also axially displaceable and, in its longitudinal direction, has a portion 70' of square or rectangular configuration and a portion 70'' of round or circular configuration. The portion 70' is mounted so as to be axially displaceable in a square or rectangular opening in the lug or projection 60 so that the shaft 70 is rotated when the actuating lever is pivoted in a vertical direction. A first entrainment member 72 is fixed on the portion 70' of the shaft, that is to say, the portion with the square or rectangular configuration, in such a way as to be non-rotatable and non-displaceable in an axial direction. The first entrainment member 72 has a projecting portion which bears on a step 74 on the arm of the holder 38 which is remote from the switching means 24 and 26. If now the actuating lever 58 is pivoted vertically upwardly in the first actuating phase, then the projecting portion of the first entrainment member 72 is pivoted downwardly and presses the switching means 24 and 26 upwardly into the second position, against the force of the spring 42, as will be apparent from a comparison between FIGS. 3 and 4. In this connection, it should be pointed out that the step 74 is moved away with respect to the projecting portion of the first entrainment member 72, by virtue of the pivotal movement of the holder 38. If therefore the actuating lever 58 continues to be pivoted in the same direction, then the projecting portion of the first actuating lever or member 72 slides down against the side surface of the step 74, which extends substantially vertically, without then further entraining the holder 38.

Figure 7A:
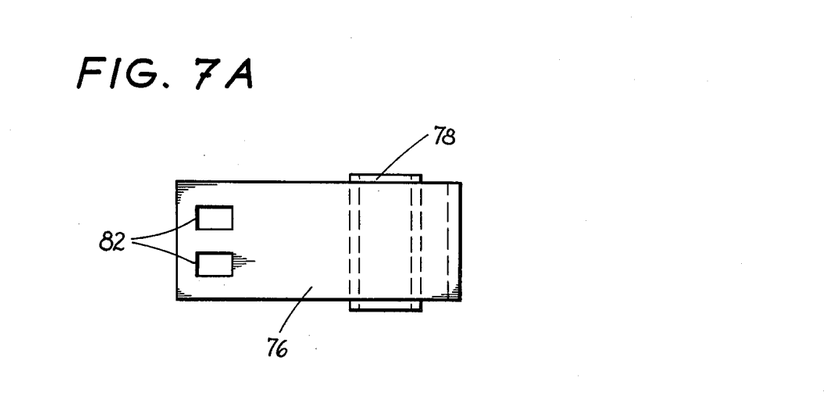
FIGS. 7a and 7b show a plan view and a side view respectively of a second entrainment member.
Figure 7B:
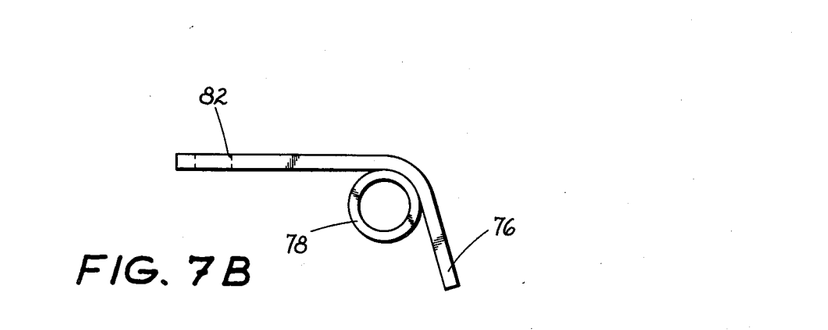

A second entrainment member, in the form of a flat plate which is bent around a tube member 78 and to which the tube member 78, is welded is arranged on the circular portion of the shaft 70 in such a way as to be axially fixed but rotatable relative thereto. The plate-like second entrainment member 76 extends through an aperture 80 in the slide member 32 and at its end has two openings 82 (see FIG. 7a) into which the teeth of the detent bar member 36 can engage (see FIGS. 3 through 5). As indicated in FIG. 5, after the first actuating phase, in which the first entrainment member 72 has pressed the holder 38 into the second position, the second entrainment member 76 is entrained in the second actuating phase by the first entrainment member 72, the projecting portion of which is now inoperative, that is to say, slides down against the side surface of the step 74 without causing further pivotal movement of the holder 38. The downward rotational movement of the second entrainment member 76 causes it to come out of engagement with the bar member 36 so that the slide member 32 is now released for movement in a horizontal direction.

Such movment is then produced by turning the actuating lever 58 about its own axis, in which case the third entrainment member 62 which is formed by the crank of the actuating lever displaces the slide member. With displacement of the slide member 32, by virtue of the locking action of the second entrainment member 76, in aperture 80 of the slide member 32, there is also a corresponding movement of the second entrainment member 76 and thus the shaft 70 and the first entrainment member 72. The shaft 70 moves axially through the lug or projection 60 and the second entrainment member 72 moves together with the holder 38. Therefore, the fact that the second entrainment member 76 engages through the aperture 80 in the slide member 32 ensures synchronisation in respect of the movements of the slide member 32 and the holder 38 with the movements of the entrainment members 72 and 76.

Figure 6:
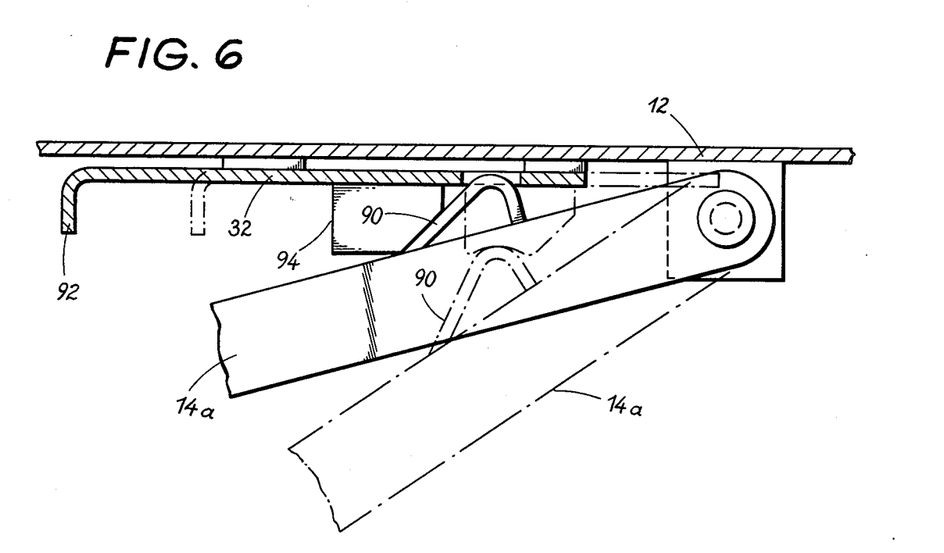
FIG. 6 shows a part of the seat with the seat support frame in the lowermost position.

Reference is now made to FIG. 6, showing the manner in which an abutment 90 provided on the pivot arm 14a co-operates with the slide member 32 for fixing the lower limit position of the seat support frame 12. As the position of the slide member 32 alters according to the selected seat height, the spring travel distance in an upward direction remains the same for all set seat heights.

A similar situation arises in regard to the upper limit position of the seat support frame, which, as shown in FIG. 2, is defined by a flange 92 on the slide member 32 co-operating with a rubber buffer member 92 on the horizontally movable end of the pivot arm 14b.

It will be appreciated that the invention is not restricted to the embodiment described and illustrated herein. If for example the vehicle has a compressor, then the electrical switch 26 can be replaced by an inlet valve which opens a compressed air conduit connected to the air bellows arrangement 16. Equally well however, the outlet and inlet valves can be combined together to form a single valve means which is actuated by means of a T-shaped control lever, as shown for example in DAS (German published application) No. 15 05 507. In addition, similarly to the manner shown in DAS No. 15 05 507, the arrangement according to the invention can also be disposed in a vertical direction, that is to say, the slide member, detent bar means and holder extend downwardly from the seat support frame 12, in which case however the sender or actuator member (member 30 in the drawing) will be arranged stationarily on the main frame. It will be appreciated that the mechanism can also be arranged conversely on the main frame 10.

The arrangement with only a single actuating lever, the automatic release of the holder when the correct weight setting is attained and the horizontally displaceable control member can also be embodied independently of each other in a motor vehicle seat of the general kind set forth at the beginning of this specification.

What is claimed is:

1. In a sprung vehicle seat with adjustment for height and for weight so that the vehicle seat is always at a manually adjustable preset height, even when users of the seat are of different weights, said sprung vehicle seat being of the type which includes a gas spring arranged between a seat support frame and a base frame; a switching means for controlling the gas spring; an actuator means which is movable relative to the switching means when there is a change in the height of the seat support frame above the base frame; a slide member which for the purposes of adjusting the preset height can be locked to one of the frames selectively in a plurality of positions on a line of displacement which is parallel to the relative displacement between the switching means and the actuator means; a holder which is carried by the slide member and movable transversely with respect to the line of displacement thereof between a first and a second position and which carries either the switching means or the actuator means, wherein the holder is spring-biassed toward the first position, in which first position the actuator means and the switching means are spaced from each other in the transverse direction of their relative movement by a spacing such that the actuator means and the switching means are non-cooperable, thereby to avoid actuation of the gas spring during normal spring movement of the seat while the seat is occupied by a user, while in the second position of the holder the actuator means and the switching means are sufficiently close together in the transverse direction of their relative movement that the actuator means and the switching means are cooperable to provide adjustment for weight; and a three-stage actuating means which includes at least one pivotal actuating lever and which in the first actuating stage pivots the holder into its second position, in the subsequent second actuating stage releases the locking action on the slide member, and in a third actuating stage shifts the slide member from one position into another position, the improvement comprising: the actuating means has only a single actuating lever which is manually movable in two different modes and first and second entrainment means, the first entrainment means urging the holder into the second position during the first actuating stage and the second entrainment means releasing the locking action on the slide member during the second actuating stage as the actuating lever is moved in one of said modes; and the actuating means includes a third entrainment means which is operative when the actuating lever is actuated in the other mode of actuation thereof in the third actuating phase so as to entrain the slide member to move it from one position to another.

2. A seat as set forth in claim 1 wherein the holder is arranged pivotally on the slide member and has a step portion, the first entrainment means engaging the step portion of the holder during the first actuating stage to pivot the holder into its second position, and the first entrainment means sliding against a side surface of the step portion without producing further pivotal movement of the holder during the second actuating stage.

3. A seat as set forth in claim 1 wherein the side member can be locked to a row of detent means provided on the frame and extending parallel to the line of movement of the slide member, wherein the slide member is guided linearly along the line of movement thereof, wherein there is a shaft which extends parallel to the line of movement of the slide member and which carries the first and the second entrainment means, the first and second entrainment means being displaceable in the longitudinal direction of the shaft and rotatable about the axis thereof, and wherein the second entrainment means can be brought into and out of engagement with said detent positions, the second entrainment means being locked to the slide member but being movable transversely to the line of movement thereof.

4. A seat as set forth in claim 3 wherein the first entrainment means is non-rotatably connected to the shaft and the second entrainment means is mounted freely rotatably on the shaft and is entrained by the first entrainment means after the first actuating stage.

5. A seat as set forth in claim 3 or claim 4 wherein the actuating lever extends normal to the shaft and is pivotal about the axis thereof.

6. A seat as set forth in claim 4 wherein the first and second entrainment means are arranged axially fixed on the shaft, the shaft extends axially movably through a lug means of the actuating lever and is non-rotatably connected to said lug means, and said lug means is mounted on a support means secured to the frame, rotatably about the axis of said shaft.

7. A seat as set forth in claim 1 wherein the third entrainment means is formed as a crank at the end of the actuating lever, and the actuating lever is rotatable about its longitudinal axis, and wherein the end of the crank engages into a slot in the slide member, said slot extending transversely with respect to the line of movement of the slide member.

8. A seat as set forth in claim 1, further comprising latch means for latching said holder to the slide member when said holder is moved to its second position, and release element means which is displaced relative to the holder when there is a change in the height of the seat support frame above the base frame for releasing the locking action of the holder to the slide member to free said holder for return to its first position when the relative position of the actuator and the switching means is such that the switching means is not actuated by the actuator means when the holder is in its second position, by virtue of the completion of the adjustment for weight.

9. A seat as set forth in claim 8 wherein the latch means comprises a double-armed detent lever which is mounted pivotally on the holder, one end of said lever, which is formed as a pawl means, being biassed against a detent projection of the slide member and being locked thereto in said second position of the holder, the other end of said lever co-operating with the release element means for pivoting the detent lever out of the position of engagement with said detent projection on the slide member.

10. A seat as set forth in claim 1 wherein the frame to which said slide member is secured carries a control member wich is displaceable relative to the holder when there is a change in the height of the seat support frame above the base frame, one of said actuator member and said switching means being disposed on said control member.

11. A seat as set forth in claim 10 wherein said seat has a scissors-like support assembly having pivotal arms, wherein said slide member and said control member are arranged horizontally displaceably on one of said seat support and base frames, and wherein said control member is connected to a horizontally movable end of a pivotal arm of said scissors-like support assembly, said horizontally movable end engaging said frame.

12. A sprung seat with adjustment for height and for weight so that the seat attains a manually adjustable preset height when in use, even when users of the seat have different weights, comprising:
   a vertically movable seat support frame;
   a control member movable along a linear path;
   means linking said seat support frame to said control member for positioning said control member along its path at a location dependent upon the height of the seat support frame;
   a slide member linearly movable along a path parallel to the path of said control member;
   locking means for immobilizing the slide member;
   a holder carried by said slide member and movable with respect thereto from a first position spaced apart from the control member to a second position adjacent the control member;
   an actuator member affixed to either the control member or holder;
   switching means affixed to the other of the control member or holder for detecting the relative position of said actuator member with respect to said holder when said holder is in its second position, said switching means additionally including means for adjusting the seat to the preset height by varying the height of said seat support frame when said holder is in its second position until said switching means and actuator member achieve a predetermined relative relationship;
   a manually operable actuating lever mounted for movement in a first mode and a second mode; and actuating means for moving said holder to its second position and for unlocking said locking means when said actuating lever is moved in the first mode, and for moving said control member along its path to change the preset height when said actuating lever is moved in the second mode.

13. The seat of claim 12, wherein said actuating lever has an axis, wherein said actuating lever is moved in its second mode when it is rotated about its axis, and wherein said actuating lever is moved in its first mode when it is rotated about a line substantially perpendicular to its axis.

14. The seat of claim 13, wherein said holder is pivotally mounted on said slide member and is biassed toward its first position, and wherein said actuating means comprises a first entrainment member which engages the holder to rotate the holder to its second position when movement of the actuating lever in the first mode is begun, a second entrainment member which unlocks the locking means upon further movement of the actuating lever in the first mode, and third entrainment means for shifting the slide member when the actuating lever is moved in the second mode.

15. The seat of claim 14, wherein said holder has a slot and said third entrainment means comprises a crank affixed to the actuating lever and engaging the slot.

16. The seat of claim 13, wherein said slide member has a slot and an opening; wherein said holder is spring-biassed in its first position; and wherein said actuating means comprises a shaft with an axis disposed substantially parallel to the paths of said control member and said slide member, said shaft being rotatable and linearly movable along its axis, a lug affixed to the shaft with respect to rotation but not with respect to linear movement, said actuating lever being rotatably mounted on said lug, a first entrainment member affixed to the shaft with respect to rotation and linear movement, said first entrainment member being configured to rotate said holder to its second position when said actuating lever is moved in its first mode, a second actuating member affixed to the shaft with respect to linear movement but not rotation, said second entrainment member extending through said opening in said slide member and being positioned to engage said locking means, and a third entrainment member configured as a crank affixed to said actuating lever and extending through said slot.

17. The seat of claim 16, wherein said locking means comprises a fixedly mounted detent bar having teeth arranged in a row that is substantially parallel to the paths of the control member and slide member, and wherein said second entrainment member has a portion thereof configured for selective engagement with the teeth of the detent bar to lock the slide member into place.

18. The seat of claim 13, further comprising latch means for locking said holder into its second position after manual movement of the actuating lever in the first mode, and means mounted on the control member for unlocking the latch means after the seat has attained the preset height.

19. The seat of claim 17, further comprising latch means for locking said holder into its second position after manual movement of the actuating lever in the first mode, and means mounted on the control member for unlocking the latch means after the seat has attained the preset height.

20. The seat of claim 19, wherein said latch means comprises a lever element pivotally mounted on the holder, said lever element having a first arm and a second arm positioned to engage a projection on the slide member when said holder is moved to its second position, and wherein said means mounted on the control member for unlocking the latch means after the seat has attained the preset height comprises a cam positioned to engage the second arm of the lever element.

* * * * *